United States Patent
Wang et al.

(10) Patent No.: US 10,079,627 B1
(45) Date of Patent: Sep. 18, 2018

(54) JOINT POWER ALLOCATION, PRECODING, AND DECODING METHOD AND BASE STATION THEREOF

(71) Applicant: National Tsing Hua University, Hsinchu (TW)

(72) Inventors: Chin-Liang Wang, Hsinchu (TW); Jyun-Jhe Jheng, New Taipei (TW); Jyun-Yu Chen, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 15/658,416

(22) Filed: Jul. 25, 2017

(30) Foreign Application Priority Data

Mar. 15, 2017 (TW) .............................. 106108456 A (51) Int. Cl.
*H04B 7/04* (2017.01)
*H04B 7/06* (2006.01)
*H04B 7/0426* (2017.01)
*H04B 7/0456* (2017.01)

(52) U.S. Cl.
CPC ......... *H04B 7/0426* (2013.01); *H04B 7/0465* (2013.01); *H04B 7/0617* (2013.01); *H04B 7/0626* (2013.01)

(58) Field of Classification Search
CPC .. H04B 7/0452; H04B 7/0626; H04B 7/0617; H04B 7/0456
See application file for complete search history.

(56) References Cited

U.S. PATENT DOCUMENTS

| | | | | |
|---|---|---|---|---|
| 2012/0314570 A1* | 12/2012 | Forenza | ................. | H04B 7/024 370/230 |
| 2014/0029522 A1* | 1/2014 | Farmanbar | ............ | H04L 5/0035 370/329 |
| 2015/0358064 A1* | 12/2015 | Benjebbour | ......... | H04B 7/0452 370/329 |
| 2016/0100413 A1* | 4/2016 | Hwang | ............... | H04W 72/082 370/330 |

FOREIGN PATENT DOCUMENTS

| | | |
|---|---|---|
| CN | 104871464 | 8/2015 |
| CN | 105790816 | 7/2016 |
| TW | 201620279 | 6/2016 |

OTHER PUBLICATIONS

Anass B et al. (WO 2014104114 A1) corresponding to US 2015/0358064 listed above.*

* cited by examiner

*Primary Examiner* — Ross Varndell
(74) *Attorney, Agent, or Firm* — JCIPRNET (57) ABSTRACT

This invention provides a joint power allocation, precoding, and decoding method and a base station thereof. They are applicable to multiple-input multiple-output non-orthogonal multiple access (MIMO-NOMA) systems. The method includes: (1) decomposing the precoder for each cluster into a first precoder and a second precoder; (2) obtaining the mean-squared error (MSE) functions of the decoded signals for all user equipment devices in each cluster; (3) calculating the power allocation factors for each cluster in the case of minimizing the maximum of all the MSE functions in each cluster; and (4) obtaining the second precoder and the decoders for each cluster in the case of minimizing a sum of the MSE functions of the decoded signals for all user equipment devices in all clusters under a total power constraint according to the power allocation factors.

20 Claims, 3 Drawing Sheets

JOINT POWER ALLOCATION, PRECODING, AND DECODING METHOD AND BASE STATION THEREOF

CROSS-REFERENCE TO RELATED APPLICATION

This application claims the priority benefit of Taiwan application serial no. 106108456, filed on Mar. 15, 2017. The entirety of the above-mentioned patent application is hereby incorporated by reference herein and made a part of this specification.

BACKGROUND OF THE INVENTION

Field of the Invention

The invention relates to a joint power allocation, precoding, and decoding method and a base station using the same that are adapted to a downlink multiple input multiple output non-orthogonal multiple access (MIMO-NOMA) system.

Description of Related Art

Along with the development of technology, due to obvious improvement of a non-orthogonal multiple access (NOMA) system in capacity, NOMA has become a promising candidate for the next generation of wireless communication systems.

In a NOMA system, user multiplexing can be implemented in the power domain of the transmitting end, and then the receiving end adopts a successive interference cancellation (SIC) technique to separate multiple user signals. Therefore, a base station may allocate more transmission power to the user signal with a poor channel condition, and allocate less transmission power to the user signal with a better channel condition, so as to have successful decoding of the two users' signals.

On the other hand, since the multiple-input multiple-output (MIMO) technique may obviously improve the system performance by taking advantages of spatial multiplexing and diversity gains, a technique of combining MIMO and NOMA (i.e., MIMO-NOMA) has been developed to further improve the system performance.

Although a MIMO-NOMA system may improve the system performance, the current technique is to directly decompose the transmission channel of the system into a plurality of parallel single input single output (SISO) NOMA transmission channel, and the spatial multiplexing and diversity gains of the MIMO technique are not taken into consideration.

Therefore, how to indeed take the advantage of the spatial multiplexing and diversity gains in a MIMO-NOMA system to provide better system performance becomes an important issue in related fields.

SUMMARY OF THE INVENTION

The invention is directed to a joint power allocation, precoding, and decoding method, which considers the mean-squared error (MSE) performance of a multiple input multiple output non-orthogonal multiple access (MIMO-NOMA) system to provide a joint design for power allocation, precoding, and decoding.

The invention provides a joint power allocation, precoding, and decoding method, which is adapted to a base station in a MIMO-NOMA system used for transmitting messages to 2K user equipment devices (UEs), where the 2K UEs are divided into K clusters, each cluster includes two UEs, the UE with a larger channel gain in each cluster is called a strong user, and the other UE is called a weak user. The method comprises the following steps: (1) decomposing a precoder corresponding to each of the clusters into a first precoder and a second precoder, where the first precoder is generated according to a block diagonalization precoding technique; (2) obtaining a first mean-squared error (MSE) function of a first signal decoded by a first decoder and a second MSE function of a second signal decoded by a second decoder that are related to the strong user, and a third MSE function of a second signal decoded by a third decoder that is related to the weak user in each of the clusters; (3) calculating a power allocation factor $\alpha_k$ corresponding to each of the clusters based on minimizing the maximum of the first MSE function, the second MSE function, and the third MSE function in each cluster under a condition that the second precoder is given, where $$0 < \alpha_k < \frac{1}{2};$$

and (4) obtaining the second precoder, the first decoder, and the third decoder corresponding to each of the clusters by minimizing a sum of all of the first MSE functions and all of the third MSE functions of the K clusters under a total transmission power constraint according to the power allocation factor $\alpha_k$.

In an embodiment of the invention, after the step (4), the method further includes repeating the steps (3) and (4) according to the newly obtained second precoder until the sum of all of the first MSE functions and all of the third MSE functions of the K clusters converges, so as to obtain optimal solutions of the power allocation factor, the second precoder, the first decoder, the second decoder, and the third decoder.

In an embodiment of the invention, the number of antennas of the base station is greater than the sum of dimensions of K−1 singular vector spaces of K−1 interference channel matrices corresponding to any one of the K clusters.

In an embodiment of the invention, the first signal and the second signal include a plurality of parallel data symbols transmitted synchronously.

In an embodiment of the invention, the step of calculating the power allocation factor $\alpha_k$ corresponding to each of the clusters based on minimizing the maximum of the first MSE function, the second MSE function, and the third MSE function in each cluster under a condition that the second precoder is given includes calculating the power allocation factor $\alpha_k$ corresponding to each of the clusters based on minimizing the maximum of the first MSE function and the second MSE function in each cluster; and calculating the power allocation factor $\alpha_k$ corresponding to each of the clusters based on minimizing the maximum of the first MSE function and the third MSE function in each cluster.

In an embodiment of the invention, the step of calculating the power allocation factor $\alpha_k$ corresponding to each of the clusters based on minimizing the maximum of the first MSE function, the second MSE function, and the third MSE function in each cluster under a condition that the second precoder is given includes setting the first MSE function to be equal to the second MSE function and setting the first MSE function to be equal to the third MSE function to obtain a quadratic equation related to the power allocation factor $\alpha_k$; solving the quadratic equation to obtain two solutions of the power allocation factor $\alpha_k$; and choosing a greater one of the two solutions to serve as an optimal solution of the power allocation factor $\alpha_k$.

In an embodiment of the invention, the step of setting the first MSE function to be equal to the second MSE function and setting the first MSE function to be equal to the third MSE function to obtain the quadratic equation related to the power allocation factor $\alpha_k$ includes using a Taylor expansion to approximate an inverse matrix associated with the power allocation factor $\alpha_k$.

In an embodiment of the invention, the step of calculating the power allocation factor $\alpha_k$ corresponding to each of the clusters based on minimizing the maximum of the first MSE function, the second MSE function, and the third MSE function in each cluster under a condition that the second precoder is given includes substituting the optimal solution of the power allocation factor $\alpha_k$ into the inverse matrix to check whether the corresponding inverse matrix satisfies a convergence condition of Taylor approximation, and set the power allocation factor $\alpha_k$ to a fixed value if the inverse matrix does not satisfy the convergence condition.

In an embodiment of the invention, the step of obtaining the second precoder, the first decoder, and the third decoder corresponding to each of the clusters by minimizing the sum of all of the first MSE functions and all of the third MSE functions of the K clusters under a total transmission power constraint according to the power allocation factors includes obtaining the first decoder and the third decoder corresponding to the strong user and the weak user in each of the clusters by minimizing the sum of all of the first MSE functions and all of the third MSE functions of the K clusters under a condition that the second precoder is given; and obtaining the second precoder corresponding to each of the clusters by minimizing the sum of all of the first MSE functions and all of the third MSE functions of the K clusters under the total transmission power constraint according to the first decoder and the third decoder.

In an embodiment of the invention, the step of obtaining the second precoder corresponding to each of the clusters by minimizing the sum of all of the first MSE functions and all of the third MSE functions of the K clusters under transmission power constraint according to the first decoder and the third decoder includes adopting Karush-Kuhn-Tucker (KKT) conditions to obtain the second precoder corresponding to each of the clusters by minimizing the sum of all of the first MSE functions and all of the third MSE functions of the K clusters.

The invention provides a base station, which is adapted to a MIMO-NOMA system. The base station includes a transceiver circuit, a storage circuit and a processing circuit. The transceiver circuit includes a plurality of antennas configured to transmit messages to 2K user equipment devices (UEs), where the 2K UEs are divided into K clusters, each cluster includes two UEs, the UE with a larger channel gain in each cluster is called a strong user, and the other UE is called a weak user. The storage circuit stores a plurality of program codes. The processing circuit is coupled to the transceiver circuit and the storage circuit, and is configured to execute the following steps: (1) decomposing a precoder corresponding to each of the clusters into a first precoder and a second precoder, where the first precoder is generated according to a block diagonalization precoding technique; (2) obtaining a first mean-squared error (MSE) function of a first signal decoded by a first decoder and a second MSE function of a second signal decoded by a second decoder that are related to the strong user in each of the clusters, and a third MSE function of a second signal decoded by a third decoder that is related to the weak user; (3) calculating a power allocation factor $\alpha_k$ corresponding to each of the clusters based on minimizing the maximum of the first MSE function, the second MSE function, and the third MSE function in each cluster under a condition that the second precoder is given, where $$0 < \alpha_k < \frac{1}{2};$$

and (4) obtaining the second precoder, the first decoder, and the third decoder corresponding to each of the clusters by minimizing a sum of all of the first MSE functions and all of the third MSE functions of the K clusters under a total transmission power constraint according to the power allocation factor $\alpha_k$.

In an embodiment of the invention, the processing circuit is further configured to execute a step of repeating the steps (3) and (4) according to the newly obtained second precoder until the sum of all of the first MSE function and all of the third MSE function of the K clusters converges, so as to obtain optimal solutions of the power allocation factor, the second precoder, the first decoder, the second decoder, and the third decoder.

In an embodiment of the invention, the number of antennas of the transceiver circuit is greater than the sum of dimensions of K−1 singular vector spaces of K−1 interference channel matrices corresponding to any one of the K clusters.

In an embodiment of the invention, the first signal and the second signal include a plurality of parallel data symbols transmitted synchronously.

In an embodiment of the invention, the processing circuit is further configured to execute steps of calculating the power allocation factor $\alpha_k$ corresponding to each of the clusters based on minimizing the maximum of the first MSE function and the second MSE function in each cluster; and calculating the power allocation factor $\alpha_k$ corresponding to each of the clusters based on minimizing the maximum of the first MSE function and the third MSE function in each cluster.

In an embodiment of the invention, the processing circuit is further configured to execute steps of setting the first MSE function to be equal to the second MSE function and setting the first MSE function to be equal to the third MSE function to obtain a quadratic equation associated with the power allocation factor $\alpha_k$; solving the quadratic equation to obtain two solutions of the power allocation factor $\alpha_k$; and choosing a greater one of the two solutions to serve as an optimal solution of the power allocation factor $\alpha_k$.

In an embodiment of the invention, the processing circuit is further configured to execute a step of using a Taylor expansion to approximate an inverse matrix associated with the power allocation factor $\alpha_k$.

In an embodiment of the invention, the processing circuit is further configured to execute steps of substituting the optimal solution of the power allocation factor $\alpha_k$ into the inverse matrix to check whether the corresponding inverse matrix satisfies a convergence condition of Taylor approximation, and set the power allocation factor $\alpha_k$ to a fixed value if the inverse matrix does not satisfy the convergence condition.

In an embodiment of the invention, the processing circuit is further configured to execute steps of obtaining the first decoder and the third decoder corresponding to the strong user and the weak user in each of the clusters by minimizing the sum of all of the first MSE functions and all of the third MSE functions of the K clusters under a condition that the second precoder is given; and obtaining the second precoder corresponding to each of the clusters by minimizing the sum of all of the first MSE functions and all of the third MSE functions of the K clusters under the total transmission power constraint according to the first decoder and the third decoder.

In an embodiment of the invention, the processing circuit is further configured to execute a step of adopting Karush-Kuhn-Tucker (KKT) conditions to obtain the second precoder corresponding to each of the clusters by minimizing the sum of all of the first MSE functions and all of the third MSE functions of the K clusters.

According to the above description, the embodiment of the invention provides a joint power allocation, precoding, and decoding method and a base station thereof. In the invention, a first precoder capable of cancelling inter-cluster interference is first obtained through the block diagonalization precoding technique to decompose MIMO-NOMA channels of multiple clusters into a plurality of parallel single-cluster MIMO-NOMA channels. Considering the MSE performance of the MIMO-NOMA system, two optimization problems for determining power allocation factors, second precoders, and decoders are successively customized to achieve a certain level of the MSE performance. Moreover, the final optimal power allocation factors, the final optimal second precoders, and the final optimal decoders are obtained through an iterative algorithm, so as to further improve the MSE performance. Overall, the performance of the MIMO-NOMA system can be effectively improved to provide better transmission quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
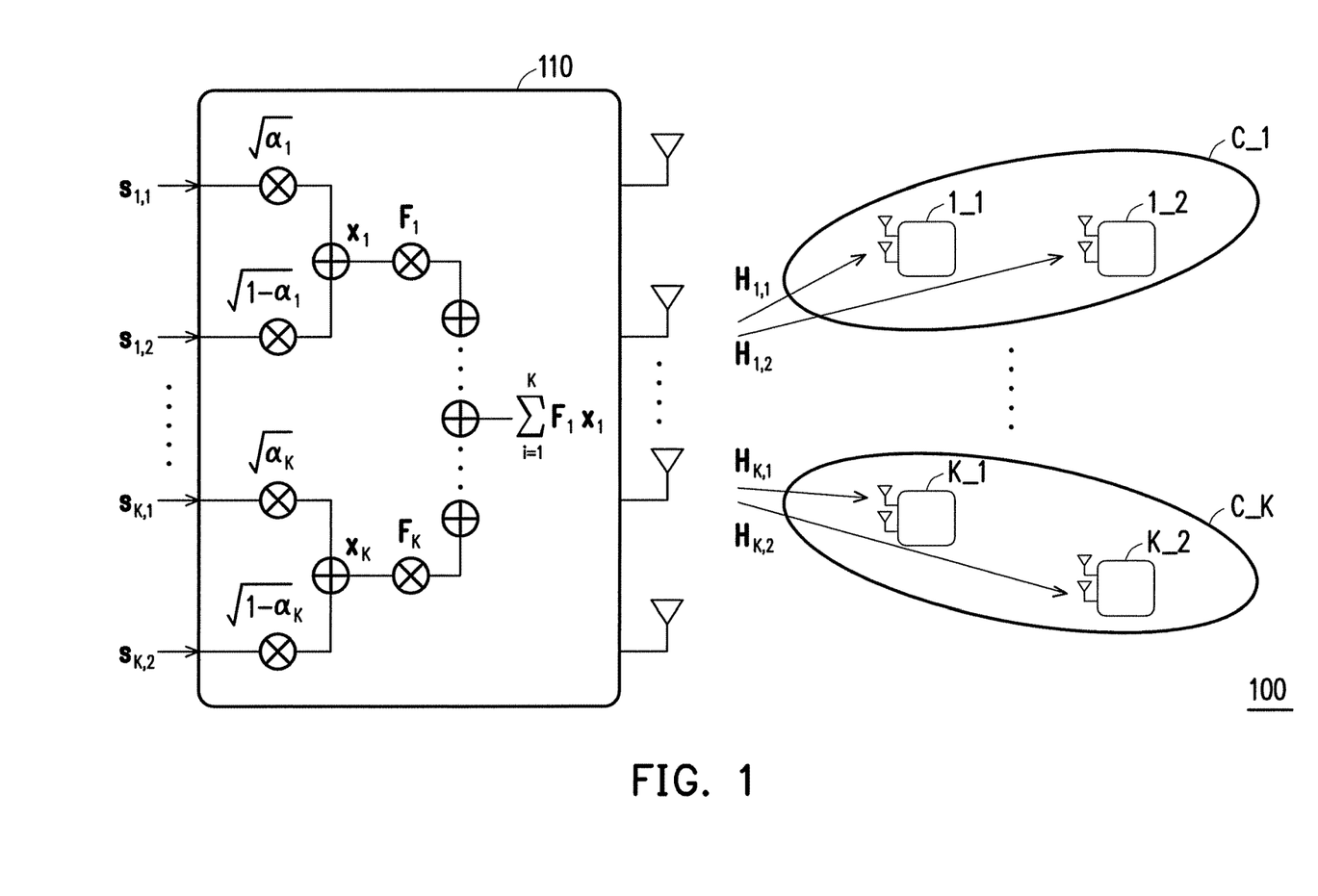
FIG. 1 is a schematic diagram of a downlink multi-cluster large-scale MIMO-NOMA system according to an embodiment of the invention.

FIG. 1 is a schematic diagram of a downlink multi-cluster large-scale MIMO-NOMA system according to an embodiment of the invention. In the embodiment of the invention, the downlink large-scale MIMO-NOMA system 100 includes a base station 110 and 2K user equipment devices (UEs) divided into K clusters (i.e., clusters $C\_1, C\_2, \ldots, C\_K$ and UEs $1\_1, 1\_2, \ldots, K\_1, K\_2$), where $K \geq 1$. Transmission ranges of different clusters are not overlapped to each other, and each cluster includes two UEs sharing a same transmitting end spatial correlation matrix. In the invention, it is assumed that global channel state information is known, i.e., information of channel matrix $H_{k,i}$ ($k=1, \ldots, K$, $i=1, 2$) between the base station 110 and the 2K UEs is obtained. Besides, the base station 110 is equipped with $N_T$ antennas, and each of the UEs $1\_1, 1\_2, \ldots, K\_1, K\_2$ is equipped with $N_R$ antennas, where $N_T \gg N_R$.

In the present embodiment, the UEs $1\_1, 1\_2, \ldots, K\_1, K\_2$ are, for example, implemented by (but are not limited to) mobile stations, advanced mobile stations, servers, user ends, desktop computers, laptops, network computers, work stations, personal digital assistants, tablet personal computers (PCs), scanners, telephone devices, pagers, cameras, televisions, handheld video game devices, music devices, wireless sensors, etc., which are not limited by the invention.

In the present embodiment, the base stations 110 may include (but not limited to): an eNB, a home eNB, an advanced base station, a base transceiver system, an access point, a home base station, a relay, an intermediate node, an intermediate equipment device, and/or a satellite-based communication base station, though the invention is not limited thereto.

In view of hardware component, the base station 110 may at least include (but not limited to) a transceiver circuit, a processing circuit and a storage circuit selected optionally. The transceiver circuit may include a transmitter circuit, a receiver circuit, an analog-to-digital (A/D) converter, a D/A converter, a low noise amplifier, a mixer, a filter, an impedance matching element, a transmission line, a power amplifier, one or a plurality of antenna circuits and a local storage medium (though the invention is not limited thereto). The storage circuit is, for example, a memory, a hard disk or any other device used for storing data, which is adapted to record a plurality of program codes or modules.

The processing circuit is configured to process a digital signal and execute functions of a method provided by exemplary embodiment of the invention, a processing program or method steps. The processing circuit is optionally coupled to the storage circuit to store program codes, device configurations, a codebook, buffered or permanent data, etc. The functions of the processing circuit can be implemented by a programmable unit such as a microprocessor, a micro controller, a DSP chip, a FPGA, etc. The function of the processing circuit can also be implemented by an independent electronic device or IC, and the processing circuit can also be implemented by hardware or software.

In the present embodiment, it is assembled that channels of the downlink large-scale MIMO-NOMA system 100 belong to a geometric one-ring scattering model, and the antennas of the base station 110 are all set in a uniform linear array. Since the two UEs in each cluster share the same channel resource, it is considered that the two UEs in a $k^{th}$ cluster also share a same spatial correlation matrix $R_k$, $k \in \{1, \ldots, K\}$. Based on the above description, a $(m,p)^{th}$ element of a channel covariance matrix corresponding to the $k^{th}$ cluster located at an angle of arrival $\theta_k$ and having an angular spread $\Delta$ can be represented as:

$$[R_k]_{m,p} = \frac{1}{2\Delta} \int_{-\Delta+\theta_k}^{\Delta+\theta_k} e^{-j\lambda D(m-p)\frac{2\pi}{\lambda}\sin(\phi)} d\phi \qquad \text{Equation (1)}$$

where $\lambda D$ is the minimum distance between the antennas of the base station 110.

According to Equation (1), a channel matrix $H_{k,i}$ corresponding to an $i^{th}$ UE in the $k^{th}$ cluster can be represented as:

$$H_{k,i} = G_{k,i} \Phi_k^{1/2} U_k \qquad \text{Equation (2)}$$

where $i \in \{1,2\}$, $k \in \{1, \ldots, K\}$, $G_{k,i} \in \square^{N_R \times r_k}$ is a fast-fading complex Gaussian matrix complied with $G_{k,i} \sim CN(0, I_{N_R})$ distribution, $I_M$ represents an identity matrix of M×M, $\Phi_k \in \square^{r_k \times r_k}$ represents a diagonal matrix of the spatial correlation matrix $R_k$ having $r_k$ non-zero singular values, and $U_k \in \square^{r_k \times N_T}$ is a matrix constructed by singular vectors of the spatial correlation matrix $R_k$. $r_k$ can also be referred to as a spatial dimension of the singular values of the channel matrix $H_{k,i}$.

It should be noted that in the embodiment of the invention, the UEs having the channel matrix of a larger Frobenius norm square are defined as strong users (i.e., the UEs 1_1, 2_1, . . . , K_1), and the UEs having the channel matrix of a smaller Frobenius norm square are defined as weak users (i.e., the UEs 1_2, 2_2, . . . , K_2), i.e., $\|H_{k,1}\|_F^2 > \|H_{k,2}\|_F^2$.

Regarding the $k^{th}$ cluster, the base station 110 combines a signal vector $s_{k,1} \in \square^{L_k \times 1}$ of the strong user with a power allocation factor $\alpha_k$ and a signal vector $s_{k,2} \in \square^{L_k \times 1}$ of the weak user with a power allocation factor $1-\alpha_k$ into a multiplexing signal vector on a power domain, as follows:

$$x_k = \sqrt{\alpha_k} s_{k,1} + \sqrt{1-\alpha_k} s_{k,2}, k \in \{1, \ldots, K\} \quad \text{Equation (3)}$$

where the vector dimension $L_k$ of $s_{k,1}$ and $s_{k,2}$ represents the number of parallel data symbols transmitted synchronously.

By multiplying a signal vector $x_k$ by precoder $F_k \in \square^{N_T \times L_k}$, the signal vector transmitted at the base station 110 can be represented as:

$$\tilde{x} = \sum_{k=1}^{K} F_k x_k \quad \text{Equation (4)}$$

A reception signal vector of the $i^{th}$ UE in the $k^{th}$ cluster can be represented as:

$$y_{k,i} = H_{k,i} \tilde{x} + n_{k,i} = H_{k,i} \sum_{k=1}^{K} F_k x_n + n_{k,i}, \quad \text{Equation (5)}$$
$$i \in \{1,2\}, k \in \{1, \ldots, K\}$$

where $n_{k,i} \in \square^{N_R \times 1}$ is, for example, an additive white Gaussian noise (AWGN), though the invention is not limited thereto.

If the reception signal vector is spread, it can be represented as:

$$y_{k,i} = \sqrt{\alpha_k} H_{k,i} F_k s_{k,1} + \sqrt{1-\alpha_k} H_{k,i} F_k s_{k,2} + \quad \text{Equation (6)}$$
$$H_{k,i} \sum_{l=1, l \neq k}^{K} F_l (\sqrt{\alpha_l} s_{l,1} + \sqrt{1-\alpha_l} s_{l,2}) + n_{k,i}, i \in \{1,2\}$$

where a third term on the right side of Equation (6) is inter-cluster interference caused by signal vectors of other clusters, and a first term on the right side is a signal vector of the strong user (i.e., intra-cluster interference for the weak user), and the second term of the right side is a signal vector of the weak user (i.e., intra-cluster interference for the strong user).

In order to develop the potential of spatial multiplexing and diversity gains of the MIMO-NOMA system, the invention provides a system design for power allocation, precoder, and decoder of the UE with consideration of the MSE performance of the MIMO-NOMA system.

Figure 2:
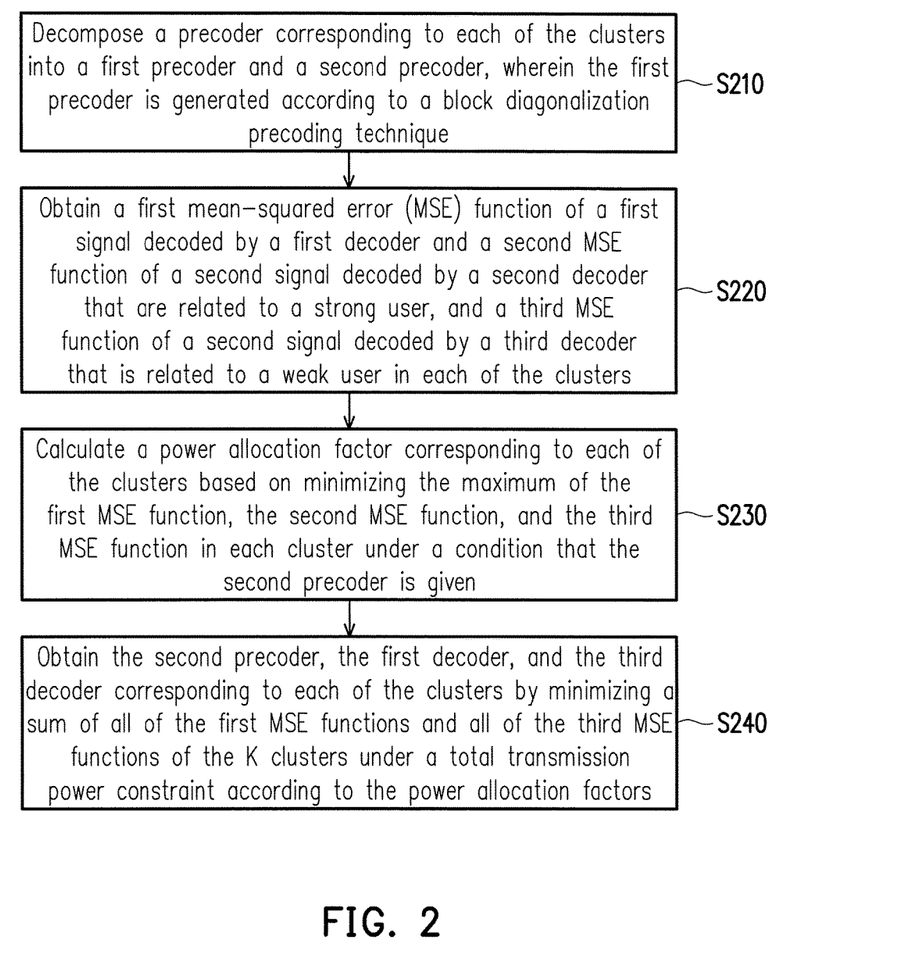
FIG. 2 is a flowchart illustrating a joint power allocation, precoding, and decoding method according to an embodiment of the invention.

FIG. 2 is a flowchart illustrating a joint power allocation, precoding, and decoding method according to an embodiment of the invention, the above method can be executed by the base station 110, and various steps of the method are introduced below with reference of the system structure of FIG. 1.

In step S210, a precoder $F_k$ corresponding to each of the clusters is decomposed into a first precoder and a second precoder, where the first precoder is generated according to a block diagonalization precoding technique.

In the present embodiment, the provided precoder $F_k$ includes a first precoder $Q_k \in \square^{N_T \times N}$ used for cancelling the inter-cluster interference and a second precoder $W_k \in \square^{N \times L_k}$ used for improving the MSE performance, and is represented as:

$$F_k = Q_k W_k, k \in \{1, \ldots, K\} \quad \text{Equation (7)}$$

where N represents the dimension of the null space of an equivalent channel matrix, and such a parameter is introduced in the following design of the first precoder $Q_k$.

According to Equations (6) and (7), the interference of the signal of the $k^{th}$ cluster on the $i^{th}$ UE in an $l^{th}$ cluster can be represented as: $H_{l,i} Q_k W_k (\sqrt{\alpha_k} s_{k,1} + \sqrt{1-\alpha_k} s_{k,2})$, $l \neq k$. In order to eliminate the inter-cluster interference, the design of the first precoder $Q_k$ of the $k^{th}$ cluster makes the corresponding signal vector $x_k$ to be 0 when reaching the receiving ends of the two UEs of the $l^{th}$ cluster through the channel matrix $H_{l,i}$. Namely, the design of the first precoder $Q_k$ is complied with the following zero interference condition: $H_{l,i} Q_k = 0$ (i.e., $G_{l,i} \Phi_l^{1/2} U_l Q_k = 0 \Rightarrow U_l Q_k = 0$), where l, $k \in \{1, \ldots, K\}$, $l \neq k$.

Based on the above description, the base station 110 adopts a block diagonalization precoder designing technique to generate the first precoder $Q_k$. To be specific, in a block diagonalization procedure, all singular vectors of (K−1) interference channel matrix ($H_{l,i}$, $l \in \{1, \ldots, K\}$, $l \neq k$) corresponding to interference terms of other clusters caused by the signal vector $x_k$ of the $k^{th}$ cluster are first collected, and are represented as a matrix $\overline{H}_k = [U_1^H \ldots U_{k-1}^H U_{k+1}^H \ldots U_K^H]^H$. The dimension of $\overline{H}_k$ is $\bar{r}_k \times N_T$, where $$\bar{r}_k = \sum_{l=1, l \neq k}^{K} r_l,$$

and when $N_T > \bar{r}_k$, N (which is equal to $N_T - \bar{r}_k$) 0 singular values of $\overline{H}_k$ and the corresponding null space can be obtained by executing the following singular value decomposition (SVD) to $\overline{H}_k$:

$$\overline{H}_k = \overline{U}_k [\Lambda_k \ 0] \overline{V}_k^H = \overline{U}_k [\Lambda_k \ 0] \begin{bmatrix} \tilde{V}_k^H \\ \hat{V}_k^H \end{bmatrix} \quad \text{Equation (8)}$$

where $\Lambda_k \in \square^{\bar{r}_k \times \bar{r}_k}$ is a diagonal matrix including $\bar{r}_k$ non-zero singular values, $\overline{U}_k \in \square^{\bar{r}_k \times \bar{r}_k}$ and $\overline{V}_k \in \square^{N_T \times N_T}$ are respectively matrices composed of left singular vectors and right singular vectors, and $\overline{V}_k$ can be represented as $\overline{V}_k = [\tilde{V}_k \ \hat{V}_k]$ by using $\tilde{V}_k \in \square^{N_T \times \bar{r}_k}$ and $\hat{V}_k \in \square^{N_T \times N}$.

A spanned vector space formed by N columns vectors of the matrix $\hat{V}_k$ is the null space of the matrix $\overline{H}_k$.

It should be noted that in order to guarantee existence of the null space of the matrix $\overline{H}_k$, and completely cancel the inter-cluster interference, the number of antennas of the transmitting end has to satisfy the following condition:

$$N_T \geq \sum_{l=1, l \neq k}^{K} r_l + \max_{k \in \{1, \ldots, K\}} \{L_k\} \quad \text{Inequation (9)}$$

where $r_l$ is the dimension of the singular vector space of the interference channel matrix $H_l$, and $L_k$ represents the number of parallel data symbols synchronously transmitted to any user of the $k^{th}$ cluster. Since $L_k \geq 1$, In equation (9) means that the number of the antennas at the transmitting end has to be greater than the sum of dimensions of K−1 singular vector spaces of K−1 interference channel matrices corresponding to any one of the K clusters.

When the equality holds in Equation (9), the dimension of the null space of the matrix $$\overline{H}_k \text{ is } N = \max_{k \in \{1, \ldots, K\}} \{L_k\}.$$

In the present embodiment, the matrix $V_k$ deduced according to Equation (8) and Equation (9) serves as the first precoder $Q_k$ of the $k^{th}$ cluster, i.e.:

$$Q_k = \hat{V}_k \quad \text{Equation (10)}$$

In this way, the base station 110 may eliminate the inter-cluster interference of Equation (6) by adopting the first precoder $Q_k$ ($k \in \{1, \ldots, K\}$) of Equation (10). Therefore, the MIMO-NOMA channels of multiple clusters of the downlink large-scale MIMO-NOMA system 100 can be decomposed into K parallel single-cluster MIMO-NOMA channels.

Figure 3:
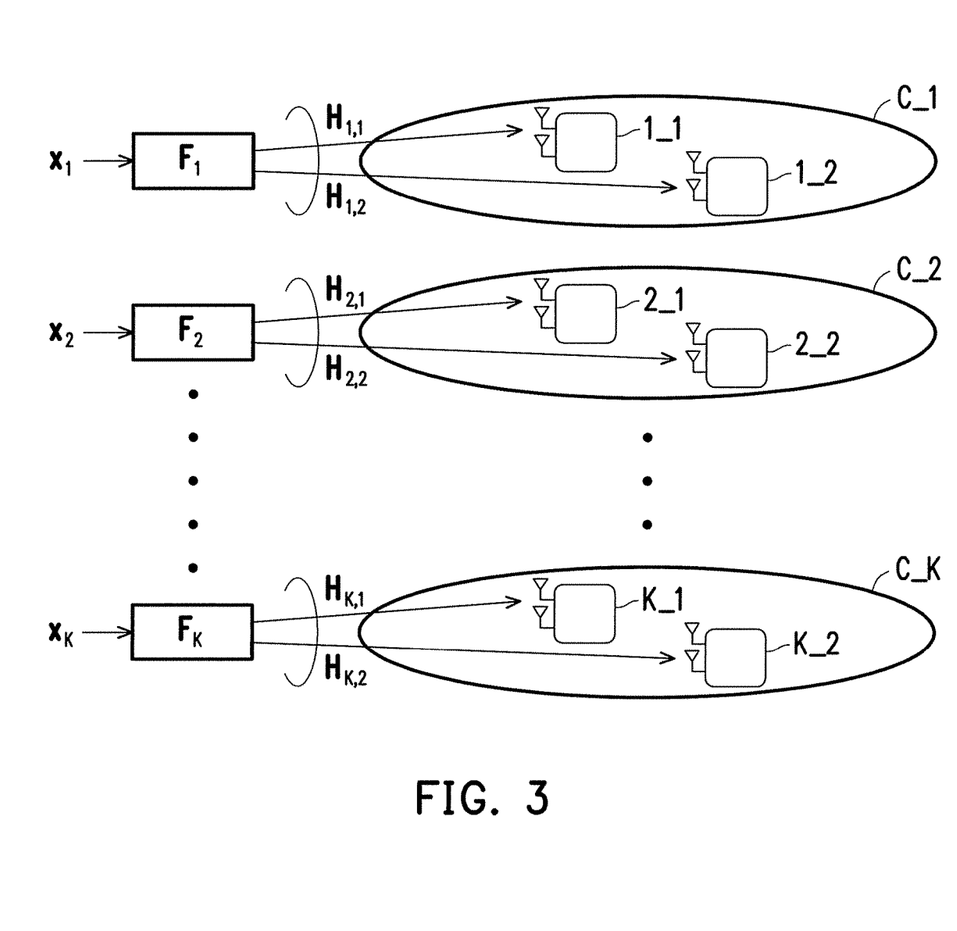
FIG. 3 is a schematic diagram of K parallel single-cluster MIMO-NOMA channels illustrated according to FIG. 1.

FIG. 3 is a schematic diagram of K parallel single-cluster MIMO-NOMA channels illustrated according to FIG. 1. In this case, the reception signal vector of the $i^{th}$ UE in the $k^{th}$ cluster can be represented as:

$$\tilde{y}_{k,i} = \sqrt{\alpha_k} H_{k,i} Q_k W_k s_{k,1} + \sqrt{1-\alpha_k} H_{k,i} Q_k W_k s_{k,2} + n_{k,i}, i \in \{1,2\}, k \in \{1, \ldots, K\} \quad \text{Equation (11)}$$

According to Equation (11), regarding the inter-cluster interference of the two UEs in the $k^{th}$ cluster, the strong user may execute SIC to remove the signal vector of the weak user, and the weak user may regard the signal vector of the strong user as a noise to directly decode the received signal vector. According to the above description, in the following description, the design of the provided downlink multi-cluster large-scale MIMO-NOMA system 100 mainly focus on discussion of the MSE performance of the two UEs in a single cluster.

In step S220, a first MSE function of a first signal decoded by a first decoder and a second MSE function of a second signal decoded by a second decoder that are related to the strong user in each of the clusters are obtained, and a third MSE function of a second signal decoded by a third decoder that is related to the weak user is obtained.

In the present embodiment, if the first decoder $D_{k,11}$, the second decoder $D_{k,12}$, and the third decoder $D_{k,22}$ are applied in the $k^{th}$ cluster to restore the signal vector of the strong user (i.e., the first signal $s_{k,1}$) and the signal vector of the weak user (i.e., the second signal $s_{k,2}$), the MSE functions of the reception signal vectors of the strong user and the weak user can be respectively represented as:

$$J_{k,12} = E\{\|D_{k,12}\tilde{y}_{k,1} - s_{k,2}\|^2\} \quad \text{Equation (12)}$$

$$J_{k,11} = E\{\|D_{k,11}\tilde{y}_{k,1}^{PSIC} - s_{k,1}\|^2\} \quad \text{Equation (13)}$$

$$J_{k,22} = E\{\|D_{k,22}\tilde{y}_{k,2} - s_{k,2}\|^2\} \quad \text{Equation (14)}$$

Equation (12) represents that the strong user in the $k^{th}$ cluster first decodes the second MSE function $J_{k,12}$ corresponding to the signal $s_{k,2}$ of the weak user through the second decoder $D_{k,12}$, Equation (13) represents that the strong user of the $k^{th}$ cluster decodes the first MSE function $J_{k,11}$ corresponding to the signal $s_{k,1}$ of the strong user through the first decoder $D_{k,11}$ under a perfect SIC assumption (i.e., $y_{k,1}^{PSIC} = \sqrt{\alpha_k} H_{k,1} Q_k W_k s_{k,1} + n_{k,1}$), and Equation (14) represents that the weak user in the $k^{th}$ cluster decodes the third MSE function $J_{k,22}$ corresponding to the signal $s_{k,2}$ of the weak user through the third decoder $D_{k,22}$.

In an embodiment of the invention, in order to seek the MSE functions corresponding to the optimal solutions of the first decoder $D_{k,11}$, the second decoder $D_{k,12}$, and the third decoder $D_{k,22}$, Equation (11) is substituted into Equations (12)-(14), and the results thereof are expressed as follows:

$$J_{k,12} = tr\{I_{L_k} + D_{k,12}\tilde{H}_{k,1}\tilde{H}_{k,1}^H D_{k,12}^H - \sqrt{1-\alpha_k} D_{k,12}\tilde{H}_{k,1} - \sqrt{1-\alpha_k}\tilde{H}_{k,1}^H D_{k,12}^H + \sigma_{k,1}^2 D_{k,12} D_{k,12}^H\} \quad \text{Equation (15)}$$

$$J_{k,11} = tr\{I_{L_k} + \alpha_k D_{k,11}\tilde{H}_{k,1}\tilde{H}_{k,1}^H D_{k,11}^H - \sqrt{\alpha_k} D_{k,11}\tilde{H}_{k,1} - \sqrt{\alpha_k}\tilde{H}_{k,1}^H D_{k,11}^H + \sigma_{k,1}^2 D_{k,11} D_{k,12}^H\} \quad \text{Equation (16)}$$

$$J_{k,22} = tr\{I_{L_k} + D_{k,22}\tilde{H}_{k,2}\tilde{H}_{k,2}^H D_{k,22}^H - \sqrt{1-\alpha_k} D_{k,22}\tilde{H}_{k,2} - \sqrt{1-\alpha_k}\tilde{H}_{k,2}^H D_{k,22}^H + \sigma_{k,2}^2 D_{k,22} D_{k,22}^H\} \quad \text{Equation (17)}$$

where $\tilde{H}_{k,1} = H_{k,1} Q_k W_k$ and $\tilde{H}_{k,2} = H_{k,2} Q_k W_k$ are the equivalent channel matrices corresponding to the strong user and the weak user, respectively.

In the present embodiment, by applying a matrix partial differential rule to Equations (15)-(17), closed-form optimal solutions of the second decoder $D_{k,12}$, the first decoder $D_{k,11}$, and the third decoder $D_{k,22}$ can be derived, which are respectively represented by $D_{k,12}^{opt}$, $D_{k,11}^{opt}$ and $D_{k,22}^{opt}$ as follows:

$$D_{k,12}^{opt} = \sqrt{1-\alpha_k}\tilde{H}_{k,1}^H(\tilde{H}_{k,1}\tilde{H}_{k,1}^H + \sigma_{k,1}^2 I_{N_R})^{-1} \quad \text{Equation (18)}$$

$$D_{k,11}^{opt} = \sqrt{\alpha_k}\tilde{H}_{k,1}^H(\alpha_k\tilde{H}_{k,1}\tilde{H}_{k,1}^H + \sigma_{k,1}^2 I_{N_R})^{-1} \quad \text{Equation (19)}$$

$$D_{k,22}^{opt} = \sqrt{1-\alpha_k}\tilde{H}_{k,2}^H(\tilde{H}_{k,2}\tilde{H}_{k,2}^H + \sigma_{k,2}^2 I_{N_R})^{-1} \quad \text{Equation (20)}$$

It should be noted that the optimal solutions of the second decoder $D_{k,12}$, the first decoder $D_{k,11}$, and the third decoder $D_{k,22}$ can also be obtained through other methods, which is not limited by the invention. It should be noted that in the invention, it is assumed that the global channel state information is obtained, so that the optimal solutions of the second decoder $D_{k,12}$, the first decoder $D_{k,11}$, and the third decoder $D_{k,22}$ are obtained by the base station 110 and are further transmitted to the UEs, or the optimal solutions can be directly calculated by the UEs, which is not limited by the invention.

The optimal solutions of the second decoder $D_{k,12}$, the first decoder $D_{k,11}$, and the third decoder $D_{k,22}$ are respectively substituted into Equations (15)-(17), and the MSE functions $J_{k,12}$, $J_{k,11}$ and $J_{k,22}$ (i.e., the second, the first, and the third MSE functions) associated with the signal vectors of the strong user and the weak user can be respectively changed to:

$$\hat{J}_{k,12} = tr\{I_{L_k} - (1-\alpha_k)\tilde{H}_{k,1}^H(\tilde{H}_{k,1}\tilde{H}_{k,1}^H + \sigma_{k,1}^2 I_{N_R})^{-1}(\tilde{H}_{k,1})\} \quad \text{Equation (21)}$$

$$\hat{J}_{k,11} = tr\{I_{L_k} - \alpha_k\tilde{H}_{k,1}^H(\alpha_k\tilde{H}_{k,1}\tilde{H}_{k,1}^H + \sigma_{k,1}^2 I_{N_R})^{-1}(\tilde{H}_{k,1})\} \quad \text{Equation (22)}$$

$$\hat{J}_{k,22} = tr\{I_{L_k} - (1-\alpha_k)\tilde{H}_{k,2}^H(\tilde{H}_{k,2}\tilde{H}_{k,2}^H + \sigma_{k,2}^2 I_{N_R})^{-1}(\tilde{H}_{k,2})\} \quad \text{Equation (23)}$$

In step S230, a power allocation factor corresponding to each of the clusters is calculated based on minimizing the maximum of the first MSE function, the second MSE function, and the third MSE function in each cluster under a condition that the second precoder is given.

In the present embodiment, the two UEs in a single cluster are not only capable of decoding the signal vectors of themselves, the strong user may also restore the signal vector of the weak user during the SIC process of the NOMA transmission. Therefore, an optimization problem is customized for the power allocation factor associated with the two UEs in each of the clusters: regarding the $k^{th}$ cluster, the power allocation factor $\alpha_k$ is calculated according to the MSE functions $\hat{J}_{k,12}$, $\hat{J}_{k,11}$ and $J_{k,22}$ under the condition that the second precoder $W_k$ is given. A target of the optimization problem is to minimize the maximum MSE of the reception signal vectors in all of the decoding procedures, which is as follows:

$$\min_{\alpha_k} \max\{\hat{J}_{k,11}, \hat{J}_{k,12}, \hat{J}_{k,22}\} \quad \text{Equation (24)}$$

$$\text{s.t. } 0 < \alpha_k < \frac{1}{2}$$

where the restriction condition of Equation (24) represents that the optimization problem is complied with the NOMA principle, i.e., a transmission power of the signal vector of the weak user has to be greater a transmission power of the signal vector of the strong user $(1-\alpha_k > \alpha_k)$.

In order to seek a solution of the aforementioned optimization problem, partial differential of the MSE functions $\hat{J}_{k,12}$, $\hat{J}_{k,11}$ and $\hat{J}_{k,22}$ to the power allocation factor $\alpha_k$ is represented as follows:

$$\frac{d\hat{J}_{k,i2}}{d\alpha_k} = tr\left\{R_{\tilde{H}_{k,i}}\left(R_{\tilde{H}_{k,i}} + \sigma_{k,1}^2 I_{N_R}\right)^{-1}\right\}, i \in \{1, 2\}, \quad \text{Equation (25)}$$
$$k \in \{1, \ldots, K\}$$

$$\frac{d\hat{J}_{k,11}}{d\alpha_k} = tr\left\{\alpha_k R_{\tilde{H}_{k,i}}\left(\alpha_k R_{\tilde{H}_{k,i}} + \sigma_{k,1}^2 I_{N_R}\right)^{-1} \right.$$
$$R_{\tilde{H}_{k,i}}\left(\alpha_k R_{\tilde{H}_{k,1}} + \sigma_{k,1}^2 I_{N_R}\right)^{-1} -$$
$$\left. R_{\tilde{H}_{k,1}}\left(\alpha_k R_{\tilde{H}_{k,1}} + \sigma_{k,1}^2 I_{N_R}\right)^{-1}\right\} \quad \text{Equation (26)}$$

where, $R_{\tilde{H}_{k,i}} = \tilde{H}_{k,i}\tilde{H}_{k,i}^H$.

Since a derivative of Equation (25) is always a positive value, the MSE functions $\hat{J}_{k,12}$ and $\hat{J}_{k,22}$ are strict increasing functions of the power allocation factor $\alpha_k$. Moreover, as $$0 < \alpha_k < \frac{1}{2},$$

and $\alpha_k R_{\tilde{H}_{k,1}}(\alpha_k R_{\tilde{H}_{k,1}} + \sigma_{k,1}^2 I_{N_R})^{-1} - I_{N_R}$ is a negative definite matrix, the derivative of Equation (26) is always a negative value, which results in a fact that the MSE function $\hat{J}_{k,11}$ is a strict decreasing function of the power allocation factor $\alpha_k$. Therefore, with $$0 < \alpha_k < \frac{1}{2},$$

the MSE functions $\hat{J}_{k,12}$, $\hat{J}_{k,11}$ and $\hat{J}_{k,22}$ have two intersections.

According to the above result, in the present embodiment, the base station 110 may decompose the optimization problem of Equation (24) into two sub-problems of minimizing the maximum of the MSE functions $\hat{J}_{k,11}$ and $\hat{J}_{k,12}$ $$\left(\text{i.e., } \min_{\alpha_k} \max\{\hat{J}_{k,11}, \hat{J}_{k,12}\}\right)$$

and minimizing the maximum of the MSE functions $\hat{J}_{k,11}$ and $\hat{J}_{k,22}$ $$\left(\text{i.e., } \min_{\alpha_k} \max\{\hat{J}_{k,11}, \hat{J}_{k,12}\}\right).$$

In this case, the base station 110 may further obtain the power allocation factor $\alpha_k$ by respectively setting the MSE functions to be $\hat{J}_{k,11} = \hat{K}_{k,12}$ and $\hat{J}_{k,11} = \hat{J}_{k,22}$, which are as follows:

$$tr\{\alpha_k R_{\tilde{H}_{k,1}}(\alpha_k R_{\tilde{H}_{k,1}} + \sigma_{k,1}^2 I_{N_R})^{-1}\} = tr\{(1-\alpha_k)R_{\tilde{H}_{k,1}}$$
$$(R_{\tilde{H}_{k,1}} + \sigma_{k,1}^2 I_{N_R})^{-1}\} \quad \text{Equation (27)}$$

$$tr\{\alpha_k R_{\tilde{H}_{k,1}}(\alpha_k R_{\tilde{H}_{k,1}} + \sigma_{k,1}^2 I_{N_R})^{-1}\} = tr\{(1-\alpha_k)R_{\tilde{H}_{k,2}}$$
$$(R_{\tilde{H}_{k,2}} + \sigma_{k,2}^2 I_{N_R})^{-1}\} \quad \text{Equation (28)}$$

It should be noted that each term of Equations (27) and (28) respectively has the following characteristics:

$$tr\{\alpha_k R_{\tilde{H}_{k,1}}(\alpha_k R_{\tilde{H}_{k,1}} + \sigma_{k,1}^2 I_{N_R})^{-1}\} = tr\{\alpha_k \tilde{R}_{\tilde{H}_{k,1}}(\alpha_k \tilde{R}_{\tilde{H}_{k,1}} +$$
$$\sigma_{k,1}^2 I_{L_k})^{-1}\} \quad \text{Equation (29)}$$

$$tr\{(1-\alpha_k)R_{\tilde{H}_{k,1}}(R_{\tilde{H}_{k,1}} + \sigma_{k,1}^2 I_{N_R})^{-1}\} = tr\{(1-\alpha_k)\tilde{R}_{\tilde{H}_{k,1}}$$
$$(\tilde{R}_{\tilde{H}_{k,1}} + \sigma_{k,1}^2 I_{L_k})^{-1}\} \quad \text{Equation (30)}$$

$$tr\{(1-\alpha_k)R_{\tilde{H}_{k,2}}(R_{\tilde{H}_{k,2}} + \sigma_{k,2}^2 I_{N_R})^{-1}\} = tr\{(1-\alpha_k)\tilde{R}_{\tilde{H}_{k,2}}$$
$$(\tilde{R}_{\tilde{H}_{k,2}} + \sigma_{k,2}^2 I_{L_k})^{-1}\} \quad \text{Equation (31)}$$

where, $\tilde{R}_{\tilde{H}_{k,i}} = \tilde{H}_{k,i}^H \tilde{H}_{k,i}$.

According to the aforementioned characteristics, Equations (27) and (28) can be rewritten as:

$$tr\{\alpha_k \tilde{R}_{\tilde{H}_{k,1}}(\alpha_k \tilde{R}_{\tilde{H}_{k,1}} + \sigma_{k,1}^2 I_{L_k})^{-1}\} = tr\{(1-\alpha_k)\tilde{R}_{\tilde{H}_{k,1}}(\tilde{R}_{\tilde{H}_{k,1}} +$$
$$\sigma_{k,1}^2 I_{L_K})^{-1}\} \quad \text{Equation (32)}$$

$$tr\{\alpha_k \tilde{R}_{\tilde{H}_{k,1}}(\alpha_k \tilde{R}_{\tilde{H}_{k,1}} + \sigma_{k,1}^2 I_{L_k})^{-1}\} = tr\{(1-\alpha_k)\tilde{R}_{\tilde{H}_{k,2}}(\tilde{R}_{\tilde{H}_{k,2}} +$$
$$\sigma_{k,2}^2 I_{L_k})^{-1}\} \quad \text{Equation (33)}$$

However, Equations (32) and (33) indicate that the power allocation factor $\alpha_k$ is in the inverse matrix $(\alpha_k \tilde{R}_{\tilde{H}_{k,1}} + \sigma_{k,1}^2 I_{L_k})^{-1}$, such that the optimal solution of the power allocation factor $\alpha_k$ is not easy to be obtained. In order to resolve this problem, in the invention, a Taylor expansion is used to approximate the inverse matrix associated with the power allocation factor $\alpha_k$, where the Taylor approximation form corresponding to the inversion matrix can be represented as $(A+B)^{-1} \cong A^{-1} - A^{-1}BA^{-1}$. It should be noted that if the inverse matrix satisfies a Taylor approximation condition: $\|BA^{-1}\| < 1$ (or $\|A^{-1}B\| < 1$), it is ensured that the corresponding Taylor expansion converges.

In the present embodiment, the base station 110 sets $A=\alpha_k \tilde{R}_{\tilde{H}_{k,1}}$ and $B=\sigma_{k,1}^2 I_{L_k}$ to obtain the following Taylor approximation:

$$(\alpha_k \tilde{R}_{\tilde{H}_{k,1}} + \sigma_{k,1}^2 I_{L_k})^{-1} \cong (\alpha_k \tilde{R}_{\tilde{H}_{k,1}})^{-1} - (\alpha_k \tilde{R}_{\tilde{H}_{k,1}})^{-1} \sigma_{k,1}^2 I_{L_k} (\alpha_k \tilde{R}_{\tilde{H}_{k,1}})^{-1} \quad \text{Equation (34)}$$

By substituting Equation (34) into Equations (32) and (33), the following equations are obtained:

$$\alpha_k^2 tr\{\tilde{R}_{\tilde{H}_{k,1}}(\tilde{R}_{\tilde{H}_{k,1}} + \sigma_{k,1}^2 I_{L_k})^{-1}\} + \alpha_k tr\{I_{L_k} - \tilde{R}_{\tilde{H}_{k,1}}(\tilde{R}_{\tilde{H}_{k,1}} + \sigma_{k,1}^2 I_{L_k})^{-1}\} - tr\{\sigma_{k,1}^2 (\tilde{R}_{\tilde{H}_{k,1}})^{-1}\} = 0 \quad \text{Equation (35)}$$

$$\alpha_k^2 tr\{\tilde{R}_{\tilde{H}_{k,2}}(\tilde{R}_{\tilde{H}_{k,2}} + \sigma_{k,2}^2 I_{L_k})^{-1}\} + \alpha_k tr\{I_{L_k} - \tilde{R}_{\tilde{H}_{k,2}}(\tilde{R}_{\tilde{H}_{k,2}} + \sigma_{k,2}^2 I_{L_k})^{-1}\} - tr\{\sigma_{k,1}^2 (\tilde{R}_{\tilde{H}_{k,1}})^{-1}\} = 0 \quad \text{Equation (36)}$$

Based on Equations (35) and (36), $a_{k,1}=tr\{\tilde{R}_{\tilde{H}_{k,1}}(\tilde{R}_{\tilde{H}_{k,1}}+\sigma_{k,1}^2 I_{L_k})^{-1}\}$, $a_{k,2}=tr\{\tilde{R}_{\tilde{H}_{k,2}}(\tilde{R}_{\tilde{H}_{k,2}}+\sigma_{k,2}^2 I_{L_k})^{-1}\}$, $b_{k,1}=tr\{I_{L_k}-\tilde{R}_{\tilde{H}_{k,1}}(\tilde{R}_{\tilde{H}_{k,1}}+\sigma_{k,1}^2 I_{L_k})^{-1}\}$, $b_{k,2}=tr\{I_{L_k}-\tilde{R}_{\tilde{H}_{k,2}}(\tilde{R}_{\tilde{H}_{k,2}}+\sigma_{k,2}^2 I_{L_k})^{-1}\}$, and $c_{k,1}=c_{k,2}=tr\{\sigma_{k,1}^2 (\tilde{R}_{\tilde{H}_{k,1}})^{-1}\}$, the base station 110 obtains two solutions $\alpha_k^{(1)}$ and $\alpha_k^{(2)}$ of the power allocation factor $\alpha_k$ by solving a quadratic equation, which are as follows:

$$\alpha_k^{(1)}=(-b_{k,1}^2+\sqrt{b_{k,1}^2-4a_{k,1}c_{k,1}})/2a_{k,1} \quad \text{Equation (37)}$$

$$\alpha_k^{(2)}=(-b_{k,2}^2+\sqrt{b_{k,2}^2-4a_{k,2}c_{k,2}})/2a_{k,2} \quad \text{Equation (38)}$$

It should be noted that according to the MSE characteristic in Equations (25) and (26), the power allocation factor having a larger solution has a smaller MSE value compared to the power allocation factor having a smaller solution, so that the base station 110 selects the power allocation factor having the larger solution in Equations (37) and (38) to serve as the power allocation factor $\alpha_k$, which is as follows:

$$\alpha_k^* = \max(\alpha_k^{(1)}, \alpha_k^{(2)}) \quad \text{Equation (39)}$$

It should be noted that the power allocation factor $\alpha_k^*$ obtained according to the aforementioned Taylor expansion has to satisfy the Taylor approximation condition of the corresponding inverse matrix. Therefore, the base station 110 requires to further substitute the power allocation factor $\alpha_k^*$ into the Taylor approximation condition of the corresponding inverse matrix to check convergence. When $\|\sigma_{k,1}^2 I_{L_k}(\alpha_k \tilde{R}_{\tilde{H}_{k,1}})^{-1}\| \geq 1$ (or $\|(\alpha_k \tilde{R}_{\tilde{H}_{k,1}})^{-1}\sigma_{k,1}^2 I_{L_k}\| \geq 1$), the solution obtained from Equation (39) is inapplicable, which means that the corresponding channel condition is rather poor. In this case, the base station 110 sets the power allocation factor $\alpha_k^*$ to a fixed value, such as $\alpha_k^* = \frac{1}{5}$.

According to the above description, in the present embodiment, the base station 110 represents the power allocation factor $\alpha_k^*$ of the two UEs in the $k^{th}$ cluster as:

$$\alpha_k^* = \begin{cases} \max(\alpha_k^{(1)}, \alpha_k^{(2)}), & \|\sigma_{k,1}^2 I_{L_K}(\alpha_k \tilde{R}_{\tilde{H}_{k,1}})^{-1}\| < 1 \\ \frac{1}{5}, & \|\sigma_{k,1}^2 I_{L_K}(\alpha_k \tilde{R}_{\tilde{H}_{k,1}})^{-1}\| \geq 1 \end{cases} \quad \text{Equation (40)}$$

It should be noted that the power allocation factor $\alpha_k^*$ of Equation (40) means that the MSE performance of all of the decoding procedures in the $k^{th}$ cluster may at least reach a certain level.

In step S240, the second precoder, the first decoder, and the third decoder corresponding to each of the clusters are obtained by minimizing a sum of all of the first MSE functions and all of the third MSE functions of all of the clusters under a total transmission power constraint according to the obtained power allocation factor.

In the present embodiment, the base station 110 forms an optimization problem represented by the second precoder $W_k$, the first decoder $D_{k,11}$ and the third decoder $D_{k,22}$ according to the power allocation factor $\alpha_k^*$ obtained in the step S230, where $k\in\{1,\ldots,K\}$. The optimization problem is to minimize a sum of the MSE functions $J_{k,11}$ and $J_{k,22}$ of all of the clusters described in Equations (16) and (17) to obtain the optimal second precoder $W_k$, the optimal first decoder $D_{k,11}$, and the optimal third decoder $D_{k,22}$ corresponding to each of the clusters $k\in\{1,\ldots,K\}$ under a total transmission power constraint $P_T$, which is as follows:

$$\min_{W_k, D_{k,11}, D_{k,22}} \sum_{k=1}^{K} J_{k,11} + J_{k,22} \quad \text{Optimization Formulation (41)}$$

$$\text{s.t.} \quad \sum_{k=1}^{K} tr\{W_k W_k^H\} \leq P_T.$$

It should be noted that the restriction condition of Optimization Formulation (41) does not related to the first decoder $D_{k,11}$ and the third decoder $D_{k,22}$, so that with the second precoder $W_k$, the aforementioned optimization problem can be represented as:

$$\min_{D_{k,11}, D_{k,22}} \sum_{k=1}^{K} J_{k,11} + J_{k,22} \quad \text{Optimization Formulation (42)}$$

By making a gradient corresponding to the target function of Optimization Formulation (42) to be zero (or the method of the step S220 is adopted), the optimal solution $D_{k,11}^{opt}$ of the first decoder and the optimal solution $D_{k,22}^{opt}$ of the third decoder respectively described in Equations (19) and (20) can be directly obtained.

Then, with the optimal solution $D_{k,11}^{opt}$ of the first decoder and the optimal solution $D_{k,22}^{opt}$ of the third decoder, the aforementioned optimization problem for minimizing the sum of the MSE functions $J_{k,11}$ and $J_{k,22}$ of all of the clusters described in Equations (16) and (17) to obtain the optimal second precoder $W_k$ corresponding to each of the clusters $k\in\{1,\ldots,K\}$ can be represented as:

$$\min_{W_k} \sum_{k=1}^{K} J_{k,11} + J_{k,22} \quad \text{Optimization Formulation (43)}$$

$$\text{s.t.} \quad \sum_{k=1}^{K} tr\{W_k W_k^H\} \leq P_T$$

In order to solve the optimization problem, Karush-Kuhn-Tucker (KKT) conditions can be adopted, and the corresponding Lagrangian function can be represented as:

$$\zeta = \sum_{k=1}^{K} J_{k,11} + J_{k,22} + \lambda \left( \sum_{k=1}^{K} tr\{W_k W_k^H\} - P_T \right) \quad \text{Equation (44)}$$

where $\lambda \geq 0$ is a Lagrangian multiplier of the restriction condition in Optimization Formulation (43). Therefore, the KKT conditions of the aforementioned optimization problem can be represented as:

$$\frac{\partial \zeta}{\partial W_k^H} = \alpha_k^* (D_{k,11}^{opt} H_{k,1}')^H D_{k,11}^{opt} H_{k,1}' W_k - $$
$$\sqrt{\alpha_k^*} (D_{k,11}^{opt} H_{k,1}')^H + (D_{k,22}^{opt} H_{k,2}')^H D_{k,22}^{opt} H_{k,2}' W_k - $$
$$\sqrt{1-\alpha_k^*} (D_{k,22}^{opt} H_{k,2}')^H + \lambda W_k = 0$$

Equation (45a)

$$\lambda \left( \sum_{k=1}^{K} tr\{W_k W_k^H\} - P_T \right) = 0$$

Equation (45b)

$$\sum_{k=1}^{K} tr\{W_k W_k^H\} \leq P_T$$

Inequation (45c)

where $H_{k,1}'=H_{k,1}Q_k$ and $H_{k,2}'=H_{k,2}Q_k$ (not including the second precoder $W_k$) are respectively equivalent channel matrices associated with the strong user and the weak user.

Based on Equation (45a), the optimal solution of the second precoder $W_k^{opt}$ can be represented as:

$$W_k^{opt} = (\alpha_k^*(D_{k,11}^{opt}H_{k,1}')^H D_{k,11}^{opt}H_{k,1}' + (D_{k,22}^{opt} H_{k,2}')^H D_{k,22}^{opt}H_{k,2}' + \lambda I_N)^{-1} \cdot (\sqrt{\alpha_k^*}(D_{k,11}^{opt}H_{k,1}')^H + \sqrt{1-\alpha_k^*}(D_{k,22}^{opt}H_{k,2}')^H)$$

Equation (46)

According to Equation (46), it is known that a power (i.e., $tr\{W_k^{opt}(W_k^{opt})^H\}$) of the second precoder $W_k^{opt}$ corresponds to $\lambda$ strict decreasing, so that an optimal upper bound of $\lambda$ is as follows:

$$\lambda^{opt} \leq \sqrt{\frac{1}{P_T} \sum_{k=1}^{K} tr\left\{ \left(\sqrt{\alpha_k^*} Z_{k,1}^H + \sqrt{1-\alpha_k^*} Z_{k,2}^H\right) \left(\sqrt{\alpha_k^*} Z_{k,1}^H + \sqrt{1-\alpha_k^*} Z_{k,2}^H\right)^H \right\}}$$

Inequation (47)

where $Z_{k,1}=D_{k,11}^{opt} H_{k,1}'$ and $Z_{k,2}=D_{k,22}^{opt}H_{k,2}'$. According to In equation (47), the optimal $\lambda$ satisfying the total transmission power constraint $P_T$ of Optimization Formulation (43) can be obtained through a bisection searching method.

In brief, according to the joint power allocation, precoding, and decoding method of FIG. 2, the downlink large-scale MIMO-NOMA system 100 may obtain preliminary optimal solutions of the power allocation factor, the second precoder, and the decoders for each cluster to decrease the MSE of the system. It should be noted that the steps S230-S240 in FIG. 2 can be iteratively executed according to the optimal solution $W_k^{opt}$ of the second precoder for each cluster obtained in the step S240 until a sum of the first MSE functions at the strong user end and the third MSE functions at the weak user end of all of the clusters converges, so as to obtain the final optimal solutions of the power allocation factor $\alpha_k$, the second precoder $W_k$, the first decoder $D_{k,11}$, the second decoder $D_{k,12}$, and the third decoder $D_{k,22}$ adapted to minimize the MSE of the system.

In the present embodiment, the optimal solution of the second precoder $W_k$ obtained in the step S240 can be directly applied to Equations (37), (38), and (40) obtained in the step S230 to update the power allocation factor $\alpha_k$, such that the two UEs in the $k^{th}$ cluster have reasonable MSE performance. Then, the updated power allocation factor $\alpha_k$ can be directly applied to Equations (18)-(20) obtained in the step S220 and Equation (46) obtained in the step S240 to update the first decoder $D_{k,11}$, the second decoder $D_{k,12}$, the third decoder $D_{k,22}$, and the second precoder $W_k$, so as to further decrease the MSE of the system. The aforementioned iteration process is repeatedly executed until the sum of the MSE functions of all of the users in the system converges, so as to obtain the final optimal power allocation factors, the final optimal second precoders, and the final optimal decoders adapted to minimize the MSE of the system.

In summary, the embodiment of the invention provides a joint power allocation, precoding, and decoding method and a base station thereof. In the invention, a first precoder capable of cancelling the inter-cluster interference is first obtained through the block diagonalization precoding technique to decompose MIMO-NOMA channel of multiple clusters into a plurality of parallel single-cluster MIMO-NOMA channels. Considering the MSE performance of the MIMO-NOMA system, two optimization problems for determining power allocation factors, second precoders, and decoders are successively customized to achieve a certain level of the MSE performance. Moreover, the final optimal power allocation factors, the final optimal second precoders, and the final optimal decoders are obtained through an iterative algorithm, so as to further improve the MSE performance. Overall, the performance of the MIMO-NOMA system can be effectively improved to provide better transmission quality.

It will be apparent to those skilled in the art that various modifications and variations can be made to the structure of the invention without departing from the scope or spirit of the invention. In view of the foregoing, it is intended that the invention covers such modifications and variations provided they fall within the scope of the following claims and their equivalents.

What is claimed is:

1. A joint power allocation, precoding, and decoding method, adapted to a base station used for transmitting messages to 2K user equipment devices (UEs) in a multiple-input multiple-output non-orthogonal multiple access (MIMO-NOMA) system, wherein the 2K UEs are divided into K clusters, each of the K clusters includes two UEs, the UE with a larger channel gain in each of the K clusters is called a strong user, and the other UE is called a weak user, and the joint power allocation, precoding, and decoding method comprises:

(1) decomposing a precoder corresponding to each of the K clusters into a first precoder and a second precoder, wherein the first precoder is generated according to a block diagonalization precoding technique;

(2) obtaining a first mean-squared error (MSE) function of a first signal decoded by a first decoder and a second MSE function of a second signal decoded by a second decoder that are related to the strong user, and a third MSE function of a second signal decoded by a third decoder that is related to the weak user in each of the K clusters;

(3) calculating a power allocation factor $\alpha_k$ corresponding to each of the K clusters based on minimizing a maximum of the first MSE function, the second MSE function, and the third MSE function in each of the K clusters under a condition that the second precoder is given, wherein $$0 < \alpha_k < \frac{1}{2};$$

and (4) obtaining the second precoder, the first decoder, and the third decoder corresponding to each of the K clusters by minimizing a sum of all of the first MSE functions and all of the third MSE functions of the K clusters under a total transmission power constraint according to the power allocation factor $\alpha_k$.

2. The joint power allocation, precoding, and decoding method as claimed in claim 1, wherein after the step (4), the method further comprises:

repeating the steps (3) and (4) according to the second precoder until the sum of all of the first MSE functions and all of the third MSE functions of the K clusters converges, so as to obtain optimal solutions of the power allocation factor, the second precoder, the first decoder, the second decoder, and the third decoder.

3. The joint power allocation, precoding, and decoding method as claimed in claim 1, wherein the number of antennas of the base station is greater than the sum of dimensions of K−1 singular vector spaces of K−1 interference channel matrices corresponding to any one of the K clusters.

4. The joint power allocation, precoding, and decoding method as claimed in claim 1, wherein the first signal and the second signal comprise a plurality of parallel data symbols transmitted synchronously.

5. The joint power allocation, precoding, and decoding method as claimed in claim 1, wherein the step of calculating the power allocation factor $\alpha_k$ corresponding to each of the K clusters based on minimizing the maximum of the first MSE function, the second MSE function, and the third MSE function in each of the K clusters under a condition that the second precoder is given comprises:

calculating the power allocation factor $\alpha_k$ corresponding to each of the K clusters based on minimizing the maximum of the first MSE function and the second MSE function in each of the K clusters; and calculating the power allocation factor $\alpha_k$ corresponding to each of the K clusters based on minimizing the maximum of the first MSE function and the third MSE function in each of the K clusters.

6. The joint power allocation, precoding, and decoding method as claimed in claim 5, wherein the step of calculating the power allocation factor $\alpha_k$ corresponding to each of the K clusters based on minimizing the maximum of the first MSE function, the second MSE function, and the third MSE function in each of the K clusters under a condition that the second precoder is given comprises:

setting the first MSE function to be equal to the second MSE function and setting the first MSE function to be equal to the third MSE function to obtain a quadratic equation associated with the power allocation factor $\alpha_k$;

solving the quadratic equation to obtain two solutions of the power allocation factor $\alpha_k$; and choosing a greater one of the two solutions to serve as an optimal solution of the power allocation factor $\alpha_k$.

7. The joint power allocation, precoding, and decoding method as claimed in claim 6, wherein the step of setting the first MSE function to be equal to the second MSE function and setting the first MSE function to be equal to the third MSE function to obtain the quadratic equation associated with the power allocation factor $\alpha_k$ comprises:

using a Taylor expansion to approximate an inverse matrix associated with the power allocation factor $\alpha_k$.

8. The joint power allocation, precoding, and decoding method as claimed in claim 7, wherein the step of calculating the power allocation factor $\alpha_k$ corresponding to each of the K clusters based on minimizing the maximum of the first MSE function, the second MSE function, and the third MSE function in each of the K clusters under a condition that the second precoder is given comprises:

substituting the optimal solution of the power allocation factor $\alpha_k$ into the inverse matrix to check whether the inverse matrix satisfies a convergence condition of Taylor approximation, and set the power allocation factor $\alpha_k$ to a fixed value if the inverse matrix does not satisfy the convergence condition.

9. The joint power allocation, precoding, and decoding method as claimed in claim 1, wherein the step of obtaining the second precoder, the first decoder, and the third decoder corresponding to each of the K clusters by minimizing the sum of all of the first MSE functions and all of the third MSE functions of the K clusters under the total transmission power constraint according to the power allocation factor $\alpha_k$ comprises:

obtaining the first decoder and the third decoder corresponding to each of the K clusters by minimizing the sum of all of the first MSE functions and all of the third MSE functions of the K clusters under a condition that the second precoder is given; and obtaining the second precoder corresponding to each of the K clusters by minimizing the sum of all of the first MSE functions and all of the third MSE functions of the K clusters under the total transmission power constraint according to the first decoder and the third decoder.

10. The joint power allocation, precoding, and decoding method as claimed in claim 9, wherein the step of obtaining the second precoder corresponding to each of the K clusters by minimizing the sum of all of the first MSE functions and all of the third MSE functions of the K clusters under the total transmission power constraint according to the first decoder and the third decoder comprises:

adopting Karush-Kuhn-Tucker (KKT) conditions to obtain the second precoder corresponding to each of the K clusters by minimizing the sum of all of the first MSE functions and all of the third MSE functions of the K clusters.

11. A base station, adapted to a multiple-input multiple-output non-orthogonal multiple access (MIMO-NOMA) system, and the base station comprises:

a transceiver circuit, comprising a plurality of antennas configured to transmit messages to 2K user equipment devices (UEs), wherein the 2K UEs are divided into K clusters, each of the K clusters includes two UEs, the UE with a larger channel gain in each of the K clusters is called a strong user, and the other UE is called a weak user;

a storage circuit, storing a plurality of program codes; and a processing circuit, coupled to the transceiver circuit and the storage circuit, and configured to execute the following steps:

(1) decomposing a precoder corresponding to each of the K clusters into a first precoder and a second precoder, wherein the first precoder is generated according to a block diagonalization precoding technique;

(2) obtaining a first mean-squared error (MSE) function of a first signal decoded by a first decoder and a second MSE function of a second signal decoded by a second decoder that are related to the strong user in each of the K clusters, and a third MSE function of a second signal decoded by a third decoder that is related to the weak user;

(3) calculating a power allocation factor $\alpha_k$ corresponding to each of the K clusters based on minimizing a maximum of the first MSE function, the second MSE function, and the third MSE function in each of the K clusters under a condition that the second precoder is given, wherein $$0 < \alpha_k < \frac{1}{2};$$

and (4) obtaining the second precoder, the first decoder, and the third decoder corresponding to each of the K clusters by minimizing a sum of all of the first MSE functions and all of the third MSE functions of the K clusters under a total transmission power constraint according to the power allocation factor $\alpha_k$.

12. The base station as claimed in claim 11, wherein the processing circuit is further configured to execute:

repeating the steps (3) and (4) according to the second precoder until the sum of all of the first MSE function and all of the third MSE function of the K clusters converges, so as to obtain optimal solutions of the power allocation factor, the second precoder, the first decoder, the second decoder, and the third decoder.

13. The base station as claimed in claim 11, wherein the number of antennas of the transceiver circuit is greater than the sum of dimensions of K−1 singular vector spaces of K−1 interference channel matrices corresponding to any one of the K clusters.

14. The base station as claimed in claim 11, wherein the first signal and the second signal comprise a plurality of parallel data symbols transmitted synchronously.

15. The base station as claimed in claim 11, wherein the processing circuit is further configured to execute:

calculating the power allocation factor $\alpha_k$ corresponding to each of the K clusters based on minimizing the maximum of the first MSE function and the second MSE function in each of the K clusters; and calculating the power allocation factor $\alpha_k$ corresponding to each of the K clusters based on minimizing the maximum of the first MSE function and the third MSE function in each of the K clusters.

16. The base station as claimed in claim 15, wherein the processing circuit is further configured to execute:

setting the first MSE function to be equal to the second MSE function and setting the first MSE function to be equal to the third MSE function to obtain a quadratic equation associated with the power allocation factor $\alpha_k$;

solving the quadratic equation to obtain two solutions of the power allocation factor $\alpha_k$; and choosing a greater one of the two solutions to serve as an optimal solution of the power allocation factor $\alpha_k$.

17. The base station as claimed in claim 16, wherein the processing circuit is further configured to execute:

using a Taylor expansion to approximate an inverse matrix associated with the power allocation factor $\alpha_k$.

18. The base station as claimed in claim 17, wherein the processing circuit is further configured to execute:

substituting the optimal solution of the power allocation factor $\alpha_k$ into the inverse matrix to check whether the inverse matrix satisfies a convergence condition of Taylor approximation, and set the power allocation factor $\alpha_k$ to a fixed value if the inverse matrix does not satisfy the convergence condition.

19. The base station as claimed in claim 11, wherein the processing circuit is further configured to execute:

obtaining the first decoder and the third decoder corresponding to each of the K clusters by minimizing the sum of all of the first MSE functions and all of the third MSE functions of the K clusters under a condition that the second precoder is given; and obtaining the second precoder corresponding to each of the K clusters by minimizing the sum of all of the first MSE functions and all of the third MSE functions of the K clusters under the total transmission power constraint according to the first decoder and the third decoder.

20. The base station as claimed in claim 19, wherein the processing circuit is further configured to execute:

adopting Karush-Kuhn-Tucker (KKT) conditions to obtain the second precoder corresponding to each of the K clusters by minimizing the sum of all of the first MSE functions and all of the third MSE functions of the K clusters.

\* \* \* \* \*